June 25, 1974     A. T. KORNYLAK     3,819,781

TEXTURED SURFACE, CELLULAR CORE SHEET MATERIAL

Filed March 8, 1972

United States Patent Office
3,819,781
Patented June 25, 1974

3,819,781
TEXTURED SURFACE, CELLULAR CORE
SHEET MATERIAL
Andrew T. Kornylak, Hamilton, Ohio, assignor to
Kornylak Corporation, Hamilton, Ohio
Filed Mar. 8, 1972, Ser. No. 232,729
Int. Cl. B29c 5/08, 5/10
U.S. Cl. 264—46                10 Claims

ABSTRACT OF THE DISCLOSURE

Rigid sheet material for building purposes is constructed with a cellular core, preferably of rigid urethane foam, and at least one surface textured with a desired three dimensional pattern by forcing the surface material into a correspondingly shaped mold surface by the expansion of the foam material during formation of the foam core, with subsequent curing. Preferably, a continuous system employs opposed slat belt conveyors that form generally parallel rigid support surfaces moving in a common direction to back up at least one embossed or textured belt that forms the mold surface. A relatively thin gel coat, a prefabricated gel coat, a homogeneous gel sheet, or an easily deformed sheet material may be in direct contact with the textured belt to be forced into the mold cavities of the textured belt under the relatively high pressures of approximately 5 p.s.i. produced by the foaming of the core material. The thus embossed skin material and foamed core material are cured within the confined space of the opposed conveyors to form a rigid self-sustaining structure. Further, the core material may be of the self-skinning type to form a homogeneous textured surface. The thus continuously produced sheet material is side trimmed, cut into convenient lengths, and stacked for facilitating removal.

BACKGROUND OF THE INVENTION

Cellular core rigid building material is particularly desirable with respect to its low density and high thermal insulation. There are various means for a continuous production of such foamed material, for example as provided by the Pelley Pat. 3,142,864, issued Aug. 4, 1964. In this patent, opposed slat belt conveyors and cooperating side restraints provide a moving chamber in which the plastic may foam and cure in the continuous production of foamed plastic core paneling. The opposed slat belt conveyors employed by the present invention may be of any type, but are preferably of the type shown in the Pelley patent, whose disclosure is incorporated herein in its entirety for purposes of reference.

It is further known to continuously form material by molding with opposed mold cavity belts. Such a teaching is shown in the Verges et al. Pat. 3,323,167, issued June 6, 1967.

Further, various synthetic resin sheets embossed in patterns simulating, for example, brick are known to be applied directly to a preformed wall for various decorative effects.

SUMMARY OF THE INVENTION

The present invention relates to the continuous production of rigid foamed core building material having at least one surface three dimensionally textured for desired decorative effect, and being sufficiently strengthened to be cut into individual lengths, stacked, stored, handled, and used in the erection of various building surfaces. The skin that is to be embossed is formed by the application of a relatively thin resin gel coat, a prefabricated gel sheet, a homogeneous easily deformable sheet, the skin of self-skinning foamable material, or the like directly to a three dimensionally textured belt rigidly supported by a suitable conveyor surface, such as a slat belt conveyor. An opposing slat belt conveyor and side restraints form a moving passage for the controlled rise of a foamable core material, such as a urethane. The foaming of the urethane will produce a pressure of approximately 5 p.s.i. directly against the skin material to force it into the mold cavities of the directly adjacent textured belt, where it is held during curing of the foamed core, and perhaps also the curing of the skin material.

After curing, the composite sheet material with a rigid cellular core and three dimensionally molded or textured skin exits from between the opposed slat belt conveyors for subsequent side trimming and, if desired, cutting longitudinally into desired widths. Thereafter, the trimmed continuous rigid sheet material is cut to length and stacked so that stacked quantities of preferably rectangular sheets may be directly loaded into trucks or placed into temporary storage facilities.

BRIEF DESCRIPTION OF THE DRAWING

Further objects, features and advantages of the present invention will become more clear from the following detailed description of the drawing, wherein.

DETAILED DESCRIPTION OF THE DRAWING

Figure 1:
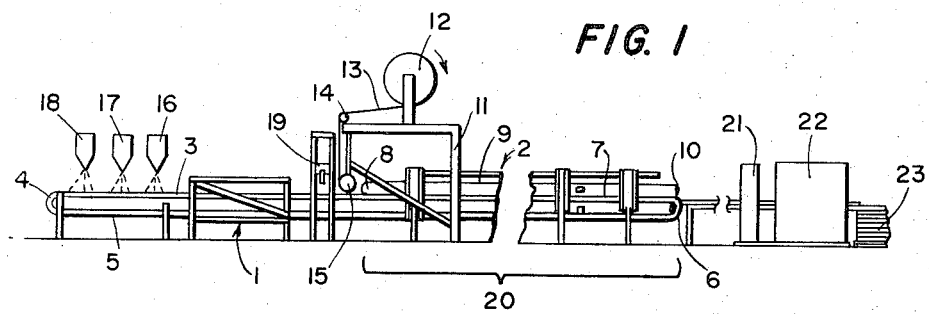
FIG. 1 shows a production method and assembly line for producing the cellular core rigid building sheet material with three dimensionally textured skin, and cutting it into lengths for stacking.

As shown in FIG. 1, the basic apparatus employed by the present invention utilizes a lower conveyor 1 and an opposed upper conveyor 2. The basic structure of these conveyors may be of the above-mentioned slat belt type wherein a plurality of rigid preferably metal slats are arranged in side by side parallel relationship along an endless path and supported by means of anti-friction bearings for movement around said path and interconnected to form a single endless belt. The lower conveyor 1 moves its slat belt along an upper horizontal path 3 around a suitable direction reversing means at one end 4, along a return path 5, and around suitable direction reversing means at its opposite end 6. Similarly, the upper conveyor 2 employs the same type of rigid slat belt conveyor moving along a path having a horizontal portion 7 that is substantially parallel to the horizontal path portion 3, a return bend portion at its end 8, a return path portion 9, and a return bend portion at its end 10. In a conventional manner, these two endless belts or conveyors 1 and 2 are mounted for movement toward and away from each other for adjusting sheet material thickness, and are oppositely driven so that the horizontal path portions 3 and 7 will be moving in the same direction, which is from left to right in FIG. 1.

A suitable rigid frame structure 11 supports a roll 12 of sheet material 13 that is fed as indicated by the arrow around a support roll 14, and a support roll 15 to move at the same speed and in the direction of the conveyor portions 3 and 7 and in direct contact with the conveyor portion 7. Suitable coating materials are provided by the separate coating means 16, 17, 18 that may spray or otherwise distribute a generally liquid coating onto the conveyor portion 3. Means 19 is provided to distribute a generally uniform coating of foamable resin onto the path portion 3 of the lower conveyor 1. These coating means 16, 17, 18, 19 may be of any known construction and for that reason have not been shown in great detail. Further, the roll 15 has a metering function or functions as a doctor to control the depth of the coating provided by the means 19.

The curing and pressurized portion of the continuous processing line is basically formed by the opposed slat belt conveyor sections and generally has the extent indicated at 20 in FIG. 1. In the conventional manner of such foam production lines, side restraint bars are provided (not shown) between the conveyors along section 20 to confine the foamable material between the opposed conveyor portions 3, 7. This type of conveyor may withstand pressures up to 10 p.s.i. and forms two opposed smooth rigid surfaces endlessly traveling over the straight path 20 to form together with the side restraint bars a controlled and pressurized expansion chamber for the foamable material to reach its full height and cure. If desired, heating means to initiate the foaming or to complete the curing may be provided along the section 20, and since they are conventional in their structure and use, they have not been shown in detail. While the conveyor portions 3 and 7 have been generally indicated as being horizontal, it is well recognized that they may actually extend at a considerable angle with respect to the horizontal and preferably within section 20 the conveyor portions 3, 7 actually diverge in the direction of travel, although slightly.

Upon exiting at end 10, the rigid sheet material may be side trimmed by conventional type of side trimmer 21 and if desired cut into desired widths. The thus trimmed rigid sheet material is transversely cut into desired lengths and stacked by means 22, which is not shown in detail since it too may be conventional in construction. Thereafter, the stack 23 may be transferred to awaiting trucks or to a temporary storage facility. In any event, the process is continuous with the final product being cut to length and stacked.

The rigid sheet material is continuously formed as mentioned above, preferably with four standard width machines, to produce panels 4 feet, 6 feet, 8 feet, and 9 feet in width respectively of a continuous length at speeds up to 30 linear feet per minute. Any width desired may be produced in addition to those specifically mentioned, for example, 2 feet or 10 feet may become popular. Side restraining walls or conveyors of various designs can be used to give the panel a finished edge needing no subsequent trimming. Also, one of the skin elements can be brought around the edge to form a finished edge.

Generally, the production speed will be between 5 and 60 linear feet of panel per minute, with speed adjustment by pushbutton control. Also, pushbutton control may be used to adjust the panel thickness, which may be in the range of ½ inch to 12 inches. The normal pressures encountered in the slat belt conveyor curing portion will be in the range of 0–5 p.s.i., with the slat belt conveyors normally withstanding pressures as high as 10 p.s.i. With the pushbutton control of panel thickness, there is an adjustable automatic overload safety feature to maintain the foam pressure within the range of 0–5 p.s.i. as desired, which is well within the capacity of the slat belt conveyors.

Figure 2:
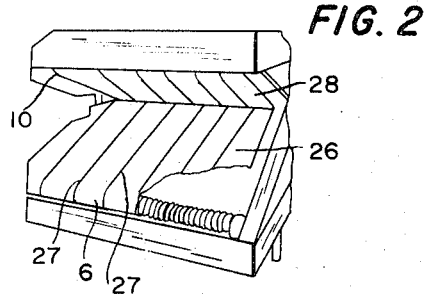
FIG. 2 is an end view of the opposed conveyors with textured belts thereon, in perspective and with portions removed.
Figure 6:
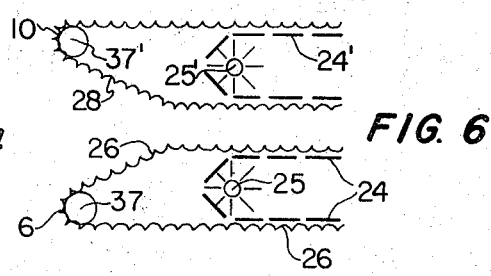
FIG. 6 is a schematic side elevation of the conveyor portion of FIG. 2.

As more fully shown in FIGS. 2 and 6, the right hand end of the section 20 shows an exit mouth wherein the opposed conveyors diverge away from each other only at the mouth to their respective ends 6, 10. As shown, the relatively rigid slat belt conveyor belt 24 extends around a direction changing means or sprocket 25. The construction of this slat belt will not be shown in detail, since it may be identical to that of the above-described patent or of any other type of similar structure. According to the present invention, a separate textured belt 26 overlies the slat belt 24 and is in engagement therewith along the entire upper horizontal path 3. In the particular embodiment shown, the textured belt 26 includes a plurality of raised ridges 27 that will provide the skin material with corresponding parallel grooves, to simulate conventional plywood paneling. The belt 26 may be provided with further texture to simulate wood graining. The upper textured belt 28 may be of similar structure, or smooth as desired and is supported by a similar slat belt conveyor 24' extending around sprocket 25'.

At least one and, if desired, both of the slat belt endless bands may be covered by textured belts 26, 28 traveling in a complimentary endless path having a straight run coinciding with and inside of the straight run of the slat belt conveyor associated therewith at least along paths 3 and 7. Preferably the textured belts extend beyond and diverge from the slat belt conveyors as shown in FIG. 6 to end pulleys 37, 37'. The textured belt may be a close woven fabric belt to produce a generally uniform embossed surface corresponding to the fabric texture of the belt. However, it is preferred to provide the belt with a texture to produce at least one embossed surface on the final product that would simulate a conventional brick wall, a stone wall, rough sawed wood, paneling, cast concrete, or the like. To produce the desired mold cavities or texture on the textured belt, it is most desirable to construct the belt from rubber (either natural or synthetic, but preferably a silicone rubber), urethane, or other elastomeric material either formed in a self-sustaining flexible sheet or bonded to a tensile substrate, such as canvas or other known belting materials. The texture can be produced during the bonded process by means of molding or embossing while the elastomer is still in an uncured state. Alternately, the elastomer may be cast in sections in a long continuous ribbon and then bonded to the belting material after it is cured to form a composite textured belt. Further, the belting material may be formed in an endless band and the elastomeric material bonded and embossed during bonding in a continuous manner. When a continuous laminated textured belt material is formed, it may be cut to length as desired and joined at its opposed ends by lacing or in an endless manner by vulcanizing or cementing to form the endless textured belt.

Suitable means are provided to guide the belt so that at least a straight portion coincides with a straight run of the slat belt conveyor with which it is associated. One basic production line setup may include a stored large stock of differently textured belts that may be selectively used as the production line textured belt for a desired panel pattern by merely interchanging them in a quick and easy manner.

While the belts may be constructed of a material that will not stick to the materials being embossed by it, it is particularly desirable to apply a release agent to the textured surface of the belt immediately prior to its entering into the molding section of the production run. Such a release agent may be of any of the known commercial types, such as wax to prevent sticking of the polyester or acrylic resin being embossed by the textured belt. Such a release agent coating may be applied by means 18. Also, a relase agent may be added directly to the polyester resin that comes in contact with the textured belt.

Figure 3:
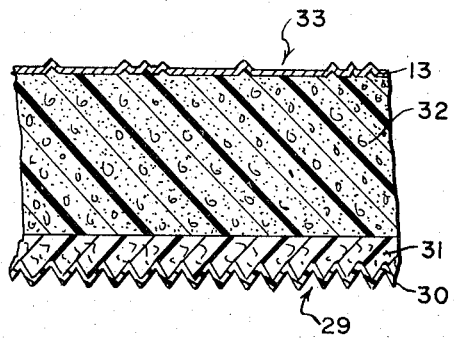
FIG. 3 is a cross section of the sheet material produced by the device and method of FIG. 1.

By way of a specific example of the method of the present invention employing the apparatus of FIGS. 1 and 2, the following will describe the production of the sheet material shown in cross section in FIG. 3.

GEL COAT SKIN PANEL

The lower surface 29 of the continuously produced panel may be formed on the textured belt 26 that runs along the path 3 and is backed by the lower of the two slat belt conveyors so that its textured surface runs horizontally through the pressure tunnel portion or section 20 of the machine with the textured surface facing upwardly. First, a release agent is preferably sprayed upon the upwardly facing textured surface of belt 26 by means 18.

Thereafter, a mixture preferably consisting of 50 parts fiberglass resin and ¾ parts of hardener is sprayed or otherwise applied by means 17 uniformly to the release agent coated textured surface, preferably in a very thin coat 30. Thereafter, chopped fiberglass fibers are directly applied on top of the above-mentioned thin coat 30 of resin mixture along with a relatively thick coat of the same above-mentioned fiberglass resin mixture with hardener to cover the chopped fiberglass fibers; alternately, the chopped fiberglass fibers may be mixed with the fiberglass resin and hardener and applied as a mixture 31 by means 16 to the previously applied thin coat 30 of fiberglass resin alone. A setting period of 8–10 minutes follows this application, which is accomplished by correlating the conveyor distance between the above-mentioned application stations 16, 17 and the entrance at 8 of the pressure tunnel 20 to the linear conveyor speed so that the layers of fiberglass resin 30 and mixed chopped fiberglass fibers and fiberglass resin 31 are preferably partially cured for 8–10 minutes or completely cured on the textured belt prior to their entry into the pressure tunnel portion at 8.

Thereafter, the conventional two components of urethane foam material (resin and blowing agent) are mixed by known metering devices and dispensed by means 19 onto the previously mentioned lamination. Some devices are capable of spreading the urethane uniformly. However, if the dispensing means does not apply the urethane uniformly, such spreading in an even and uniform thickness coating is accomplished by a metering device, such as roll 15. The coated lamination then passes into the pressure tunnel portion at 8 where it is clamped between the lower conveyor 1, upper conveyor 2, and side restraint bars (not shown) for foaming in a conventional manner, preferably with the application of heat to produce layer 32. The foaming and curing of the foam 32, together with any necessary final curing of the fiberglass resins 30, 31 is accomplished for the next 5–10 minutes, which period of time is accommodated by the length of the pressure tunnel portion 20 of the assembly line and the linear conveyor speed. Thereafter, the final rigid cured product leaves the pressure tunnel portion 20 at 10 in a continuous manner. Preferably, the final polymerizing or curing of the fiberglass resin 30 being embossed by the textured belt 26 is accomplished during the foaming process within the pressure tunnel 20, so that the partially cured fiberglass gel coat directly on the textured belt, with the interposition of a release agent, is embossed by the textured belt under the high foaming pressure, approximately 5 p.s.i., so that the lower fiberglass resin thin coat 30 will be completely and accurately embossed by the textured belt 26, and thereafter finally cured in the latter portions of the pressure tunnel 20 to emerge finally cured at the exit end at 10 of the pressure tunnel 20.

DEFORMABLE SHEET LAMINATE

The second three dimensionally configured surface 33 of the sheet material shown in FIG. 3 may be an easily deformable thin sheet, such as paper, thin metallic foil, or thin plastic sheet material provided, as shown in FIG. 1, as a continuous sheet 13 unrolled from a roll 12 guided around roller 14, 15 into direct engagement with the textured belt 28 of the upper conveyor 2. To facilitate its flow, the paper may be moistened, or the metallic foil and sheet may be heated prior to their entry into the tunnel section 20. This sheet material 13 will permanently deform into the cavities of the textured belt under the relatively high pressure of the foaming plastic forming the cellular core 32. Upon the curing of the core 32 in the latter portions of the section 20, sheet 13 will be held in its embossed or deformed shape in a permanent manner.

PREFABRICATED GEL COAT

As a modification of the above methods of forming the outer skins, a 6 mill thermoplastic carrier sheet may be unrolled from a suitable storage coil and impregnated with a polyester or acrylic resin before or after coming in contact with the lower textured belt 26 forward of the pressure tunnel 20 of the production line, to produce a 23 mill sheet that is somewhat vinyl like in appearance, which sheet will be carried by and in contact with the upper textured surface of the lower conveyor belt 26 upstream of the pressure tunnel portion 20 of the production line, with the possible interposition of a release agent. If desired, chopped fiberglass fibers and fiberglass resin may be applied in an even coat onto this 23 mill partially cured resin sheet; in this case the final product would appear as laminates 30, 31 respectively of FIG. 3. In any event, the 23 mill polyester resin sheet with or without the addition of fiberglass resin and chopped fiberglass travels along the production line for a time sufficient to partially cure or finally cure it. Thereafter, the urethane foam formulation is added in an even coat with or without a top layer 13 and the entire material enters the pressure tunnel portion 20 of the production line. In the pressure tunnel portion, the urethane will foam, and being restrained by the upper and lower belts, and the side restraint bars, will produce a pressure upwards of 5 p.s.i. to press the preferably partially cured polyester gel resin, with its polyester carrier, into the textured upper surface of the lower textured belt 26. Thereafter, the entire material, the polyester lower lamination, the fiberglass intermediate lamination is used, and the upper urethane foam laminate is finally cured as it passes through the pressure tunnel portion 20, which is long enough to effect the final curing of these materials. Upon emerging, the rigid continuous sheet will comprise, with reference to FIG. 3, a lower embossed homogeneous layer 30 of approximately 15 mill, an intermediate layer 31, if desired, of chopped fiberglass fibers and fiberglass resin for strength and being of a thickness as structurally required, and a major thickness portion 32 of foamed urethane core. The lower polyester embossed laminate 30 will hide the structural fiberglass and chopped fiberglass fiber lamination, as well as provide a pleasing embossed surface of a pattern as desired.

HOMOGENEOUS GEL SHEET

As a modification of the above processes, a homogeneous partially cured sheet of plastic, preferably polyester resin, will be extruded or otherwise formed in a continuous manner according to conventional processes and placed on the upper surface of the lower textured belt 26 for the direct application of fiberglass resin and chopped fiberglass or/and foamable urethane formulation as above mentioned, or it may be passed around suitable guide rolls to be laminated on top of a metered uniform coating of foam urethane so that as it enters the pressure tunnel portion of the fabrication line it will be in contact with the upper textured belt 28 within the pressure tunnel portion 20. In any event, the homogeneous partially cured preferably polyester sheet will travel a sufficient distance and time from its production point to the entrance at 8 of the pressure tunnel portion 20 to preferably partially cured or completely cured. As before, this polyester resin will be forced against the adjacent textured belt to be embossed and thereafter the preferred partially cured sheet will be cured completely within the tunnel portion 20.

SEPARATE GEL AND SHEET SKIN

Figure 4:
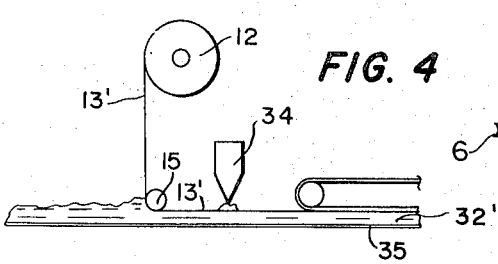
FIG. 4 is a modified portion of the device and process of FIG. 1.

As shown in FIG. 4, the apparatus and method of Claim 1 may be modified to the extent that an additional coating means 34 may apply a uniform coating of uncured or partially cured resin, preferably a polyester resin to the upper surface of sheet 13'. The remaining of the production line structure would be identical to that shown and described above with respect to FIG. 1, except with the above changes and the elimination of coating means 16, 17, 18 and the feeding of a rigid substrate. The rigid substrate would be a rigid sheet material, for example, plywood, wood composition, stiff metal, ribbed materials, refractory materials, reinforced plastic, or other rigid sheet like material 35 or components that will not be textured but will produce an outer rigid surface for the production of a composite panel with this outer surface of sheet 35, a foam urethane core 32′, the sheet material 13′ bonded to the core 32′, and the outer cured and embossed resin laminate 36. This outer laminate 36 is formed by the material that is deposited by means 34 being pressed into the mold cavities of the textured belt 28.

Figure 5:
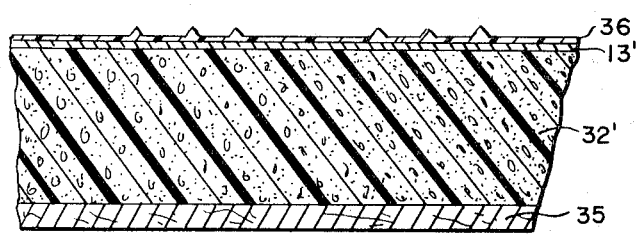
FIG. 5 is a cross sectional view of sheet material produced according to the device and method of FIG. 1 as modified by FIG. 4.

In all of the above processes, the curing may be accomplished with or without heat within the pressure tunnel portion 20 and the partial or complete curing outside the pressure tunnel portion 20 may be accomplished with or without heat. To effect complete curing within the speed ranges as mentioned above, the pressure tunnel portion 20 of the process line may be as long as 100 feet in order to allow sufficient residence time for curing. Further, the skin 13 of FIG. 3 may be employed with the rigid sheet material 35 of FIG. 5, with the cellular core 32, 32′ therebetween, and the composite skin 13′, 36 of FIG. 5 may be employed with the composite skin 30, 31 of FIG. 3, with the cellular core 32, 32′ therebetween. Further, for any of the partially cured or cured materials that are embossed, a release agent may be provided between them and the textured belt, or a release agent may be incorporated homogeneously with the material, or the characteristics of the material may be such that they will not adhere to the belt, or the characteristics of the belt may be such that they will not adhere to the material.

SELF SKINNING URETHANE FOAM

As a further specific example of the process according to the present invention, a self skinning foamable urethane formulation may be added and metered by means 19 without the addition of sheet 13, with respect to FIG. 1, to enter the pressure tunnel portion 20 of the conveyor line in direct contact with at least one of the textured belts, for example belt 28. In a known manner of the self skinning foam formulation, a continuous, homogeneous outer skin homogeneously integral with the foam core cell walls and preferably two or more times the average thickness of the cell walls is formed during the foaming process, which under the pressure of the foaming process will be embossed by the adjacent textured belt. Thus, a continuous, integral, homogeneous skin rigid urethane foam sheet emerges from the pressure tunnel portion with a dense, nonporous, embossed outer skin of urethane for at least one of the outer surfaces. The other surface may be formed solely by self skinning as smooth or textured, or according to any of the above-mentioned processes, for example to have an outer embossed sheet formed by spraying the textured belt with a clear or colored barrier or transfer coating made of acrylic, vinyl, or other preferably synthetic resin, or have a smooth or textured integral second outer skin, or may contain as an outer laminate one of the aforementioned rigid sheet materials.

For this process the pressure tunnel would preferably withstand pressures greater than 10 p.s.i. As specific examples: the material may be Duromer, a structural self skinning urethane foam of Mobay Chemical Co., Pittsburgh, Pa. 15205, with pressures 25–50 p.s.i. and a uniform temperature between 120 and 150° F. controlled ±3° F. during molding; or the material may be of the type used in and according to the Rubicast process of Rubicon Chemicals, Inc., Naugatuck, Conn. 06770. Each of these materials and suitable general processes for their molding are more fully set forth in "Modern Plastics Encyclopedia" 1971–1972, pages 149–151, the disclosure of which is incorporated herein by reference.

PRE-EMBOSSING

While all of the preceding embodiments of the present invention have employed the foaming pressure during the formation of the cellular core within the pressure tunnel to emboss the outer surface, the following embodiment embosses the outer surface separate from the foaming process and outside of the pressure tunnel, and employs pressure tunnel belts or a single belt of easily deformable material to support the previously embossed surface material during foaming of the cellular core within the pressure tunnel. Specifically, an easily permanently deformable metal foil, paper or synthetic resin sheet material, or partially cured synthetic resin sheet material is passed between two opposed pressure rolls, at least one roll of which is textured, to thus emboss the sheet as it passes through the rolls. Since such a process is commonly used to emboss sheet material, it has not been specifically shown in the drawings. The thus embossed sheet material may be rolled up, and transferred to the apparatus as shown in FIG. 1 to constitute therein the roll 12. Alternatively, the process may be completely continuous with the thus embossed sheet passing immediately to the roll or rolls 15, 14 of FIG. 1 for continuous processing according to the apparatus of FIG. 1, without any intermediate coiling.

In any event, the previously embossed sheet material arrives at roll 15 where it is guided into engagement with the outer belt 28 of the upper conveyor 8. This outer belt 28, for the present embodiment, is most preferably constructed with a continuous smooth outer surface and of a fairly thick easily and resiliently deformable material, such as foam rubber or other elastomeric material, so that under the pressure of the foaming process and the rigid backing of the slat belt supporting the resilient belt 28, the material of the resilient belt 28 will resiliently deform to accommodate and continuously support the embossed sheet without permanently deforming it. Although such a resilient conveyor belt 28 is most preferred, the previously embossed sheet may have sufficient rigidity to withstand foaming pressures without substantial permanent deformation even when engagement with a substantially rigid belt. As before, the foamable resin would be applied by means 19 to the lower conveyor 4 or material carried thereby to foam within the pressure tunnel portion 20 on the opposite side of the previously embossed sheet material from the conveyor 2. By proper selection of this outer previously embossed sheet material or by final curing between embossing and entrance into the pressure tunnel portion of a previously embossed partially cured synthetic resin, the texture will be preserved despite the desired 5 p.s.i. pressure exerted by the foaming core material within the pressure tunnel portion 20, which preservation will be particularly assured with the choice of an elastomeric highly resilient belt 28. The foamable resin may be of the self skinning urethane type as previously defined.

IN GENERAL

In all of the above embodiments, the outer textured surface will withstand denting, abrasion and cutting as desired for the finished building material. Further, as mentioned previously, this outer embossed surface will provide decorative effects as desired, the cellular core will provide a low density bulk material with load bearing capability and good insulating properties, and the laminate 31 or stiff sheet material 35 will provide sufficient strength and resistance to denting where needed.

While various examples of the invention have been given as specific and preferred embodiments, further embodiments, variations and modifications are contemplated according to the broader aspects of the spirit and scope of the present invention as defined by the following claims.

What is claimed is:

1. A method of forming sheet building material, comprising: passing a layer of foamable synthetic resin and a superposed layer of self-sustaining deformable material between opposed endless conveyors with the deformable material in substantially direct contact with a three dimensionally textured surface on its side opposite said layer of foamable material; thereafter moving said deformable material and foamable synthetic resin in a path between the conveyors while confining the foamable synthetic resin in a direction transverse to the path of movement and parallel to the surfaces of said conveyors to resist in a substantially rigid manner foaming pressures; foaming the moving foamable material during said confining step and simultaneously pressing the deformable material with the foaming pressure into the three dimensionally textured surface with permanent deformation to mold the deformable material; and thereafter curing the thus foamed foamable synthetic resin to rigidly hold the demormable material in its molded configuration.

2. The method of claim 1, wherein said foaming pressures are at least 5 p.s.i. during the step of pressing.

3. The method of claim 1, including the steps of placing the deformable material on one textured conveyor belt as an at least partially uncured synthetic resin prior to the step of foaming; and finally curing the deformable material during said step of confining and after said step of foaming.

4. The method of claim 3, including the step of forming the synthetic resin by continuously feeding a thermoplastic carrier sheet and impregnating the carrier sheet continuously with resin to form a partially cured composite sheet of a thickness several times the thickness of the thermoplastic carrier sheet before impregnating.

5. The method of claim 4, wherein said step of placing includes coating a liquid resin directly on an upwardly facing generally horizontally running endless textured belt in a substantially uniform thickness in a continuous manner.

6. The method of claim 5, including depositing a mixture of chopped glass fibers and resin onto the coated synthetic resin in a generally uniform thickness and thereafter depositing the foamable synthetic resin onto the mixture of resin and chopped glass fibers.

7. The method of claim 1, including the step of forming the synthetic resin by continuously feeding a thermoplastic carrier sheet and impregnating the carrier sheet continuously with resin to form a partially cured composite sheet of a thickness several times the thickness of the thermoplastic carrier sheet before impregnating.

8. The method of claim 7, wherein said foaming pressures are at least 5 p.s.i. during the step of pressing.

9. A method of forming sheet buiding material, comprising: premanently embossing an indefinite length sheet material in a continuous manner with a three dimensional decorative texture; passing a layer of foamable synthetic resin superposed with the previously embossed indefinite length sheet material continuously between opposed endless conveyor belts, with the previously embossed sheet material in substantially direct contact with one of the conveyor belts; moving the previously embossed sheet material and superposed foamable synthetic resin in a planar path between the opposed conveyors while confining the foamable synthetic resin in a direction transverse to the path of movement and parallel to the surfaces of the conveyors to resist in a substantially rigid manner pressures of foaming; foaming the moving foamable material during said confining step to thereby press the previously embossed indefinite length sheet material against the one conveyor belt to obtain a good bond between the foamable material and embossed sheet; curing the thus foamed foamable synthetic resin to rigidly hold the embossed sheet in its embossed configuration as a self-sustaining generally planar sheet; and resiliently supporting substantially the entire outer embossed surface of the previously embossed idefinite length sheet material with a highly resilient elastomeric belt in direct contact therewith and a rigid belt in direct contact with the other side of the elastomeric belt together constituting the conveyor belt during substantially the entire steps of foaming and curing.

10. The method of claim 9, wherein the foamable synthetic resin is a self skinning urethane so that the steps of foaming and curing will produce an inner rigid urethane foam core having a plurality of cells defined by intermediate cell walls of an average thickness, and a homogeneous and continuous outer urethane skin on both sides of the core, each having an average thickness at least twice that of the average cell wall thickness, with one of the skins bonded over its entire outer surface to the permanently embossed sheet material.

References Cited
UNITED STATES PATENTS

| | | | |
|---|---|---|---|
| 3,657,036 | 4/1972 | Mullenhoff et al. | 264—47 |
| 3,196,062 | 7/1965 | Kristal | 264—47 |
| 3,591,401 | 7/1971 | Snyder et al. | 264—47 |

MAURICE J. WELSH, Primary Examiner

U.S. Cl. X.R.

161—161; 264—47, 48; 425—4